(12) United States Patent
Wu

(10) Patent No.: US 10,069,356 B2
(45) Date of Patent: Sep. 4, 2018

(54) HOLLOW ROTOR STRUCTURE FOR DC MOTOR AND WINDING STRUCTURE OF THE SAME

(71) Applicant: XINGU MOTOR INC., Taipei (TW)

(72) Inventor: Lien-Hsin Wu, Taipei (TW)

(73) Assignee: Xingu Motor Inc., Taipei (TW)

( * ) Notice: Subject to any disclaimer, the term of this patent is extended or adjusted under 35 U.S.C. 154(b) by 218 days.

(21) Appl. No.: 15/066,465

(22) Filed: Mar. 10, 2016

(65) Prior Publication Data

US 2017/0194824 A1    Jul. 6, 2017

(30) Foreign Application Priority Data

Dec. 31, 2015  (TW) .............................. 104144666 A

(51) Int. Cl.
H02K 1/26  (2006.01)
H02K 23/40  (2006.01)
(Continued)

(52) U.S. Cl.
CPC .............. H02K 1/265 (2013.01); H02K 1/02 (2013.01); H02K 3/12 (2013.01); H02K 13/006 (2013.01); H02K 16/04 (2013.01); H02K 23/36 (2013.01); H02K 23/40 (2013.01); H02K 23/54 (2013.01); H02K 23/04 (2013.01)

(58) Field of Classification Search
CPC ............ H02K 1/14; H02K 1/146; H02K 1/24; H02K 1/30; H02K 23/00; H02K 23/02; H02K 23/04; H02K 23/05; H02K 23/26; H02K 23/30; H02K 23/32; H02K 23/40; H02K 23/54; H02K 23/56; H02K 23/58; H02K 23/06; H02K 1/02; H02K 1/26; H02K 1/265; H02K 3/12; H02K 13/00;
(Continued)

(56) References Cited

U.S. PATENT DOCUMENTS 4,060,746 A * 11/1977 Heyraud ................ H02K 23/26
                                                    310/177
4,114,057 A *  9/1978 Esters .................... H02K 23/00
                                                    310/154.23
(Continued)

OTHER PUBLICATIONS

U.S. Appl. No. 15/066,370, filed Mar. 10, 2016.
U.S. Appl. No. 15/066,301, filed Mar. 10, 2016.

*Primary Examiner* — Tran Nguyen
(74) *Attorney, Agent, or Firm* — Muncy, Geissler, Olds & Lowe, P.C.

(57) ABSTRACT

The present invention provides a hollow rotor structure for a direct-current motor and a winding structure of the same are provided for use in a direct-current motor. The hollow rotor structure includes a commutator, can output element, and a hollow rotor. The hollow rotor includes an iron core wound with a plurality of windings and is formed with an axial hole extending along the axial direction of the hollow rotor. Once mounted in a housing, the hollow rotor is spaced from a stator fixed in the housing and is separately connected to the commutator and the output element. When the commutator supplies a current to each winding, the hollow rotor generates the corresponding electromagnetic fields, which repel the magnets on the stator respectively. Thus, the hollow rotor generates a rotating force and outputs the rotating force through the output element.

7 Claims, 9 Drawing Sheets

(51) Int. Cl.
*H02K 1/02* (2006.01)
*H02K 3/12* (2006.01)
*H02K 13/00* (2006.01)
*H02K 23/36* (2006.01)
*H02K 23/54* (2006.01)
*H02K 16/04* (2006.01)
H02K 23/04 (2006.01)

(58) Field of Classification Search
CPC ...... H02K 13/006; H02K 13/04; H02K 23/36; H02K 23/38; H02K 16/04; H01R 39/04
See application file for complete search history.

(56) References Cited

U.S. PATENT DOCUMENTS

| | | | | |
|---|---|---|---|---|
| 4,305,027 | A * | 12/1981 | Wilson | H02K 23/00 318/492 |
| 6,744,169 | B2 * | 6/2004 | Yoshida | H01R 39/04 310/236 |
| 7,154,192 | B2 * | 12/2006 | Jansen | H02K 1/06 290/55 |
| 2014/0035418 | A1 * | 2/2014 | Horst | H02K 21/16 310/156.12 |
| 2017/0194844 | A1 * | 7/2017 | Wu | H02K 3/12 |

* cited by examiner

HOLLOW ROTOR STRUCTURE FOR DC MOTOR AND WINDING STRUCTURE OF THE SAME

BACKGROUND OF THE INVENTION

1. Technical Field

The present invention relates to a direct-current motor structure and more particularly to a direct-current motor structure which has a hollow rotor and a plurality of windings wound around the hollow rotor in a specific manner.

2. Description of Related Art

An electric motor, or generally referred to as a motor, serves mainly to convert the electricity received into mechanical energy and produce kinetic energy from the mechanical energy in order to drive another device. Hence, motors have been extensively used in a variety of products such as electric vehicles, lathes, electric fans, and water pumps. Generally, there are several kinds of motors, such as Direct-current (DC) motors, Alternating-Current (AC) motors, pulse motors, etc. With the advent of silicon controlled rectifiers (SCRs) and the improvement of magnetic materials, carbon brushes, and insulating materials, plus the increasing demand for variable-speed control, DC motors have once again become a crucial technology in industrial automation. This is mainly because both the "rotation speed vs. torque" and "current vs. torque" characteristic curves of DC motors are linear, which renders DC motors simple and easy to control. DC motors, therefore, remain the most common motors for variable-speed control.

Referring to FIG. 1, the structure of a conventional DC motor 1 essentially includes a housing 10, a pivot shaft 11, a rotor 12, a stator 13, and a commutator 14. The housing 10 is provided therein with a receiving space 101. The pivot shaft 11 is pivotally provided in the housing 10 and has one end formed as an output shaft 111. The output shaft 111, juts out of the housing 10. The rotor 12 is assembled from a plurality of silicon steel plates, is fixedly mounted around the pivot shaft 11, and is wound with a plurality of windings. The stator 13 is composed of permanent magnets, is fixedly provided on the inner wall of the housing 10, corresponds to the outer periphery of the rotor 12, and is spaced from the rotor 12. The commutator 14 is provided in the receiving space 101, is configured to receive external electricity, and is electrically connected to the windings in order to supply electricity to the windings. The commutator 14 can also change the direction of the current supplied to the windings. According to Fleming's left-hand rule or right-hand palm rule, a conductive wire placed in a magnetic field and supplied with a current generates a magnetic field which cuts through the existing magnetic field lines such that the conductive wire is moved. When the windings on the rotor 12 are supplied with electricity, therefore, the magnetic fields generated by the windings cut through the lines of magnetic force generated by the stator 13, producing a torque that rotates the rotor 12 and thereby converts electrical energy into kinetic energy. For example, referring to FIG. 1B, where the lines of magnetic force of the stator 13 are from left to right, a current flowing into the windings of the rotor 12 from the right and exiting to the left causes the rotor 12 to generate a torque that forces the rotor 12 into clockwise rotation.

However, the structure of the conventional DC motors, an example of which is shown in FIG. 1 and designated by the reference numeral 1, has had little innovative advancement for so long that the related industry is left with no other choice than to improve the transmission mechanisms of DC motors. The inventor of the present invention wondered whether the conventional DC motors could be improved structurally to produce a novel DC motor structure whose components (e.g., stator) can be easily adjusted in number or mounting position to suit different purposes of use, and which can hence win users' favor and secure a certain market share. The issue to be addressed by the present invention is to provide such structural improvement.

BRIEF SUMMARY OF THE INVENTION

In view of the fact that the structure of the conventional DC motors has been used for a lone time without substantial improvement, making it difficult for manufacturers to modify or change some of the components (e.g., stator), the inventor of the present invention conducted extensive research and experiment based on years of practical experience and finally succeeded in developing a hollow rotor structure for a DC motor and a winding structure of the same. The invention is intended to provide a DC motor which has better performance than its prior art counterparts and which allows some of its components to be adjusted according to practical needs.

It is an objective of the present invention to provide a hollow rotor structure for a DC motor and a winding structure of the same. The hollow rotor structure is applicable to a DC motor and includes a commutator, an output element, and a hollow rotor. The commutator and the output element are mounted at the front and rear ends of the hollow rotor respectively in order to be rotated simultaneously with the hollow rotor. The hollow rotor includes an iron core. The iron core is assembled from a plurality of silicon steel plates and is wound with a plurality of windings. The hollow rotor is also formed therein with an axial hole which extends along the axial direction of the hollow rotor. The hollow rotor is mounted in a housing of the DC motor along the axial direction of the housing and is spaced from a stator fixed in the housing. The two ends of each winding are respectively and electrically connected to two adjacent commutator plates on the commutator so as to receive a current from the commutator and thereby cause the hollow rotor to generate the corresponding electromagnetic field. According to the present invention, the stator may be implemented, as appropriate, as an inner stator in the axial hole of the hollow rotor, an outer stator around the hollow rotor, or a combination of both, with a view to adjusting the performance of the DC motor.

The second objective of the present invention is to allow the commutator to be mounted in the axial hole of the hollow rotor, and the output element to be mounted around the hollow rotor. In that case, the stator may be implemented as a front stator on the front side of the hollow rotor, a rear stator on the rear side of the hollow rotor, or a combination of both, making it possible to adjust the DC motor with great ease.

BRIEF DESCRIPTION OF THE SEVERAL VIEWS OF THE DRAWINGS

In view of the imperfection of the conventional DC motor structure described above, the inventor of the present invention incorporated years of practical experience into extensive research and experiment and finally succeeded in developing a DC motor structure with a hollow rotor and inner and outer stators as disclosed herein. The present invention is intended to provide a DC motor which performs better than its prior art counterparts.

DETAILED DESCRIPTION OF TILE INVENTION

Since the conventional DC motors have more or less the same structure, a manufacturer wishing to improve the performance of such a DC motor can only resort to improving an external device (e.g., transmission mechanism) for use in conjunction with the DC motor. To provide more choices to manufacturers with similar needs, the present invention discloses a hollow rotor structure for a DC motor and a winding structure of the same. The invention is conducive to a novel DC motor structure in which the "rotor" structure and the winding method are improved. More specifically, the applicant has developed a new "hollow rotor structure" which allows a manufacturer to adjust the number and position(s) of stator(s) according to practical needs, as described in more detail below with reference to two embodiments of the invention. The invention, however, is by no means limited to what is depicted in the accompanying drawings. One who is skilled in the art and has grasped the overall technical features of the present invention would be able to modify the appearance of each component or the number of the components disclosed.

Figure 1:
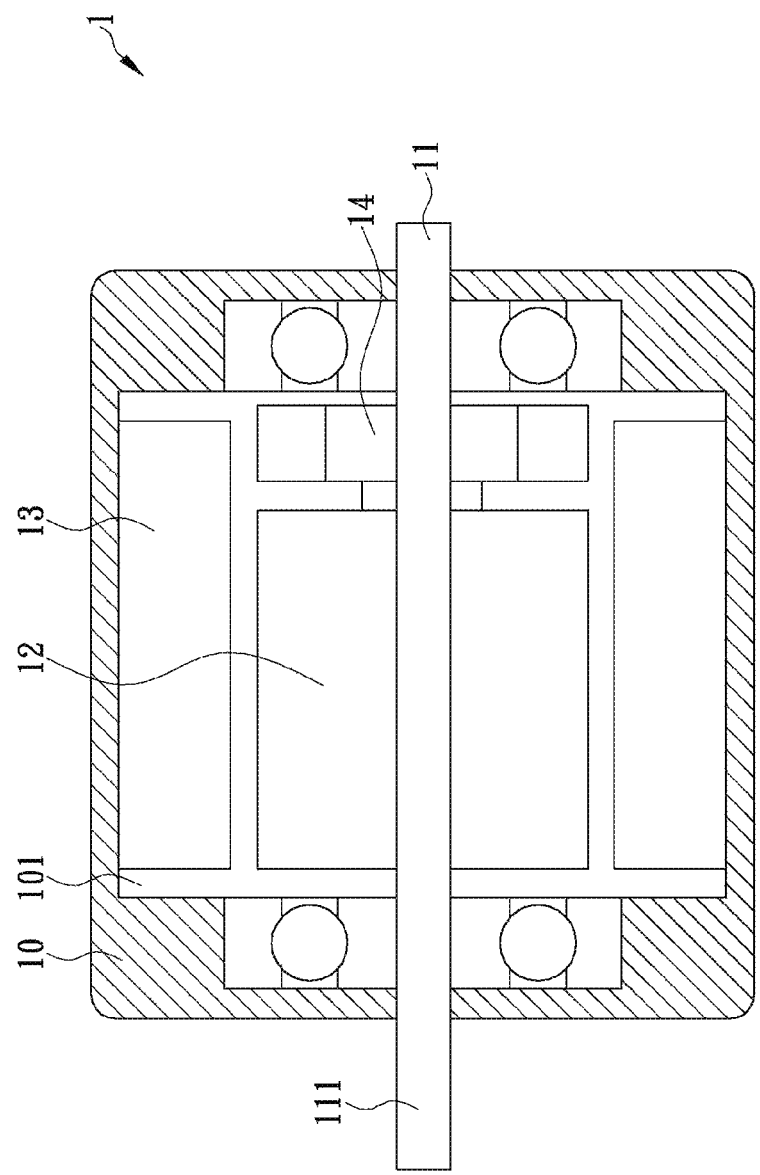
FIG. 1 schematically shows the structure of a conventional DC motor.
Figure 2:
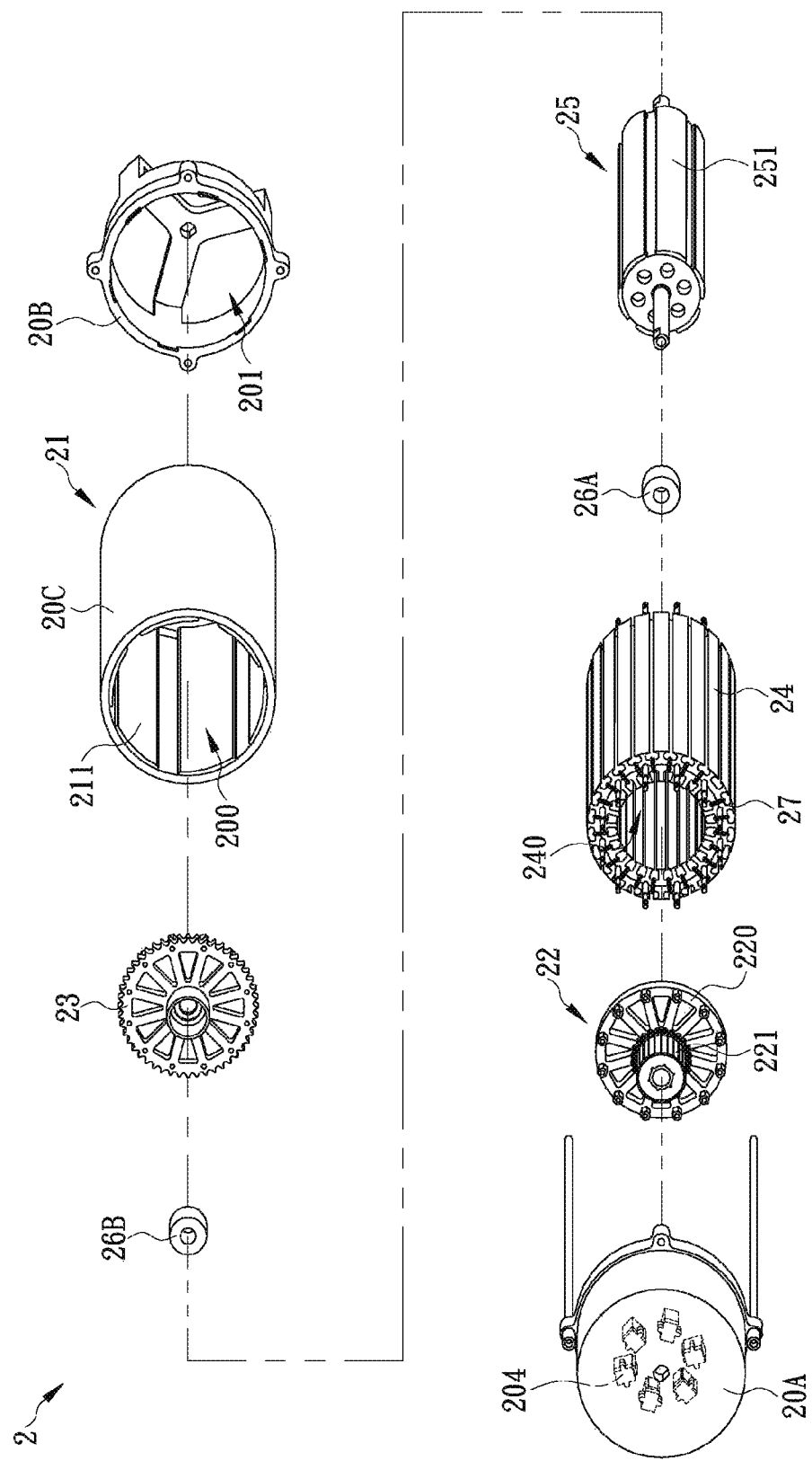
FIG. 2 is an exploded perspective view of the DC motor in the first embodiment of the present invention.

The present invention provides a hollow rotor structure for a DC motor and a winding structure of the same. Referring to FIG. 2, the hollow rotor structure and the winding structure are applied to a DC motor 2 which includes a housing 20 and at least one stator in addition to the hollow rotor structure, in the first embodiment, the housing 20 is cylindrical and is provided therein with a receiving space 200. The rear end of the housing 20 is formed with a plurality of output holes 201 in communication with the receiving space 200. Herein, an "output hole 201" refers to a space through which an output element 23 can connect with an external transmission mechanism. All configurations which enable the output element 23 to connect with an external transmission mechanism should be viewed as equivalent arrangements. The present invention imposes no limitations on how the output holes 201 should be implemented. The housing 20 is assembled from a front cover 20A, a rear cover 20B, and a housing body 20C. A plurality of carbon brushes 204 are mounted in the front cover 20A and are configured to receive external currents. The output holes 201 are provided in the rear cover 20B. The housing body 20C is tubular and is engaged between the front cover 20A and the rear cover 20B. In other embodiments of the present invention, the housing 20 may vary in shape according to practical needs (as in the second embodiment described further below).

With continued reference to FIG. 2, the hollow rotor structure includes a commutator 22, the output element 23, and a hollow rotor 24. The commutator 22 is mounted in the receiving space 200 and is pivotally connected to the inner wall of the front end of the housing 20 along the axial direction of the housing 20. The output element 23 is mounted in the receiving space 200 and is pivotally connected to the inner wall of the rear end of the housing 20 along the axial direction of the housing 20. In the first embodiment, the commutator 22 is located in the front cover 20A and includes a disk 220 and a plurality of commutator plates 221. The commutator plates 221 are mounted on the front side of the disk 220, with a space between each two adjacent commutator plates 221, and are electrically connectable to the carbon brushes 204 in the front cover 20A in order to receive external currents through the carbon brushes 204. The output element 23 is located in the rear cover 20B and corresponds in position to the output holes 201 so that a transmission element can be passed through the output holes 201 and connect with the output element 23. When the DC motor 2 is in operation, the kinetic energy generated by the DC motor 2 is output to a load (e.g., a gearbox) sequentially through the output element 23 and the transmission element to drive the load into operation. It should be pointed out that the output element 23 may vary in configuration, depending on the type of the transmission element (e.g., a chain, a closed-loop belt, or the like). For example, the output element 23 may be gear-shaped or be formed as a hub or other components, in order for the hollow rotor structure of the present invention to be applied to a greater variety of equipment or devices.

Figure 3:
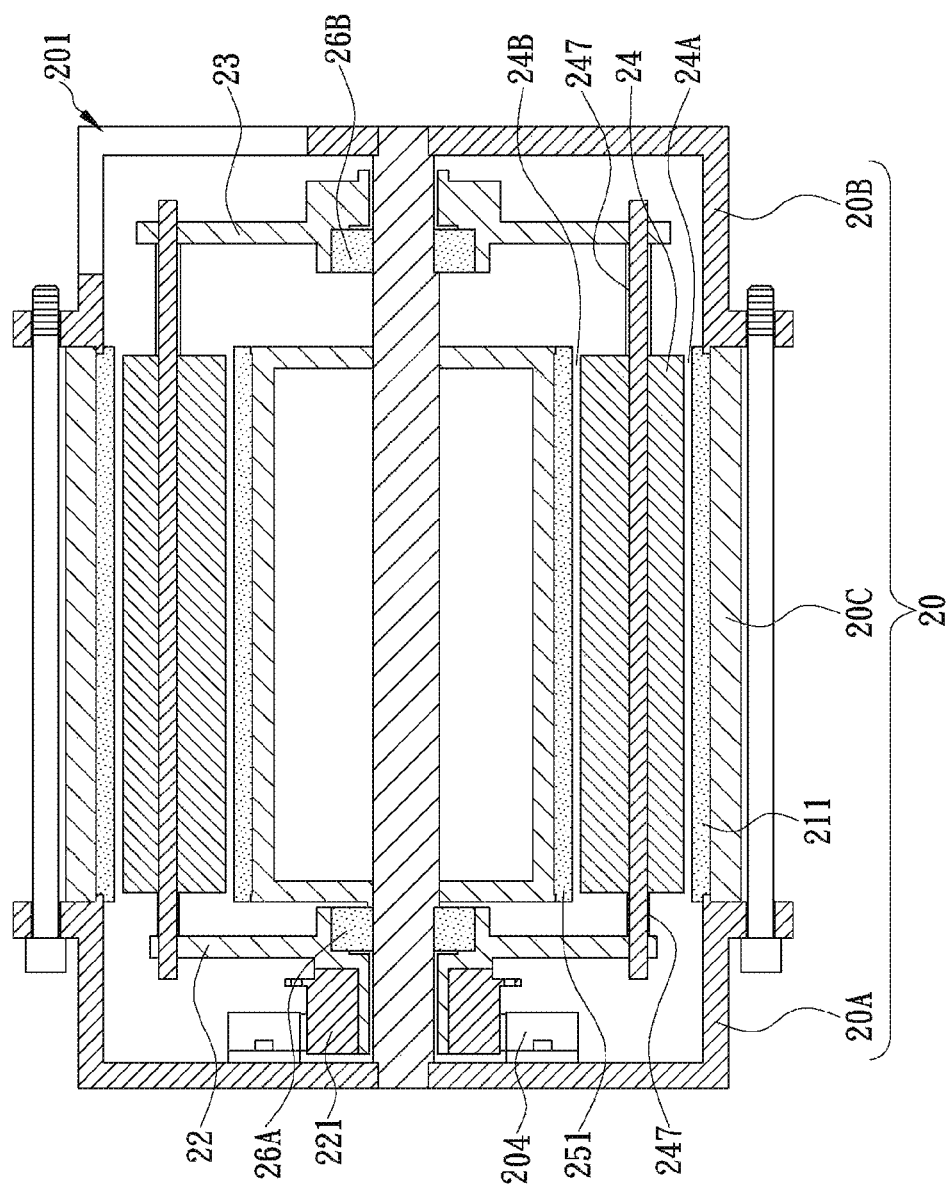
FIG. 3 is a sectional view of the DC motor in the first embodiment of the present invention.

As shown in FIG. 2 and FIG. 3, the hollow rotor 24 includes an iron core, which is preferably assembled from a plurality of silicon steel plates so that a high magnetic permeability can be achieved. The iron core may alternatively be an iron plate, a steel plate, or an integrally formed iron element; the present invention has no limitations in this regard, provided that the iron core is composed of a material capable of generating a magnetic field through the magnetic effect. The iron core is formed therein with an axial hole 240 which extends along the axial direction of the iron core. The front end of the iron core is connected to the commutator 22 while the rear end of the iron core is connected to the output element 23. In addition, the hollow rotor 24 is wound with a plurality of windings 27. The two ends of each winding 27 are respectively and electrically connected to two adjacent commutator plates 221 on the commutator 22 in order to receive the current supplied by the commutator 22 and cause the hollow rotor 24 to generate the corresponding electromagnetic field. Each two adjacent commutator plates 221 on the commutator 22 can also reverse, at a preset frequency, the direction of the current they supply to the corresponding winding 27, thereby simultaneously reversing the electromagnetic field generated by the corresponding winding 27. The reversal of current direction is carried out again and again at the preset frequency. When rotated under the action of magnetic fields, the hollow rotor 24 drives the commutator 22 and the output element 23 into rotation simultaneously.

Figure 4:
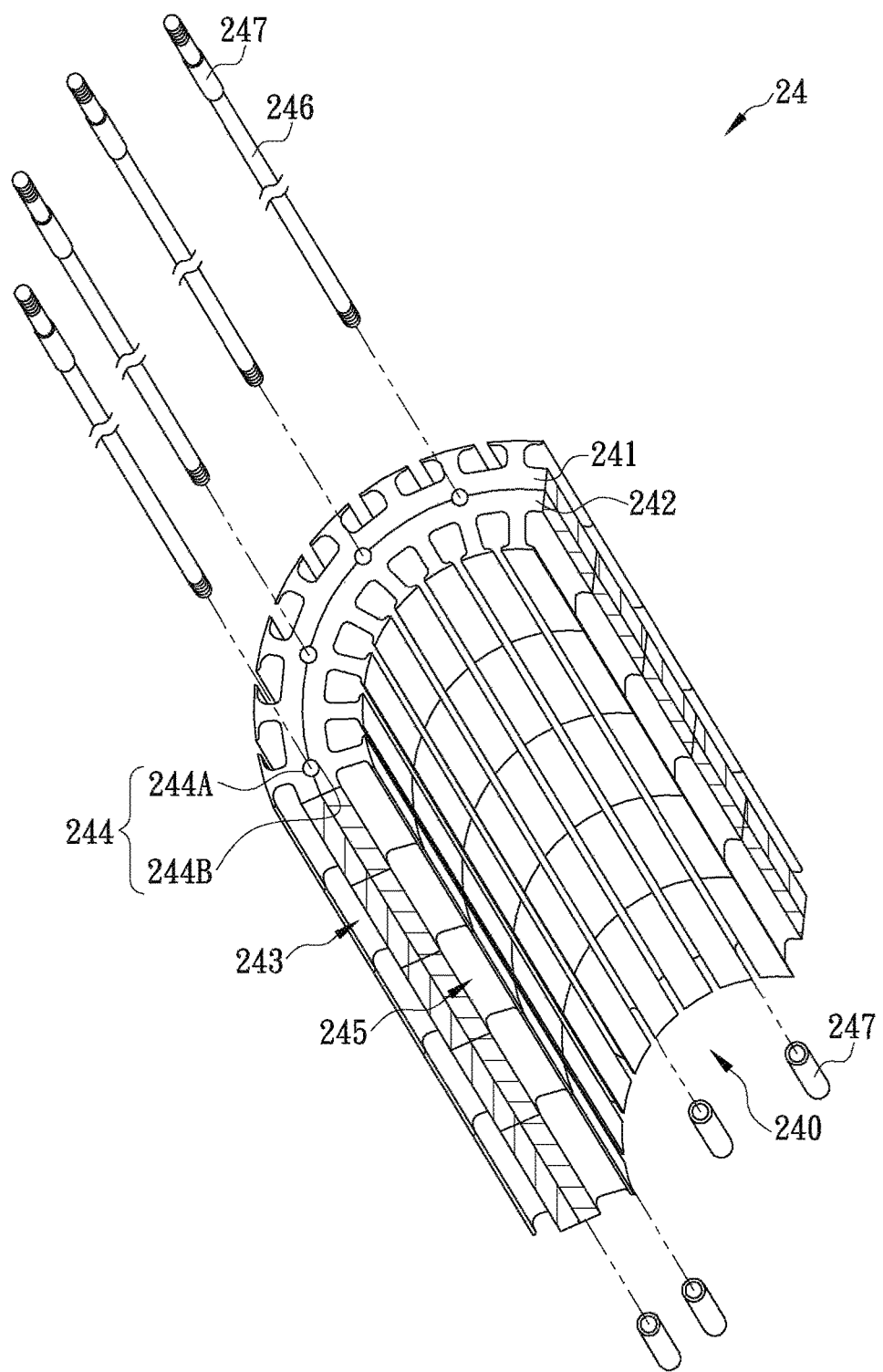
FIG. 4 is a partial perspective view of the hollow rotor in the first embodiment of the present invention.

In the first embodiment, referring to FIG. 2 and FIG. 4, the hollow rotor 24 includes an outer iron core 241 and an inner iron core 242. Preferably, the outer iron core 241 and the inner iron core 242 are each assembled from a plurality of silicon steel plates. The outer surface of the outer iron core 241 is provided with a plurality of outer winding grooves 243 which extend along the axial direction of the outer iron core 241. The inner surface of the outer iron core 241 is provided with a plurality of first recesses 244A which also extend along the axial direction of the outer iron core 241. Similarly, the inner surface of the inner iron core 242 is provided with a plurality of inner winding grooves 245 along the axial direction of the inner iron core 242 while the outer surface of the inner iron core 242 is provided with a plurality of second recesses 244B along the axial direction of the inner iron core 242. The outer winding grooves 243 and the inner winding grooves 245 are configured to be wound with the windings 27. When the outer iron core 241 and the inner iron core 242 are put together, the inner surface of the outer iron core 241 lies against the outer surface of the inner iron core 242, and each first recess 244A corresponds to one second recess 244B to form a fixing hole 244. The fixing holes 244, therefore, are arranged along the circumferential direction of the hollow rotor 24. A plurality of fixing rods 246 are inserted through the fixing holes 244 respectively to connect with the hollow rotor 24. The front end of each fixing rod 246 juts out of the hollow rotor 24 and is fixed to the rear side of the disk 220 of the commutator 22. The rear end of each fixing rod 246 also juts out of the hollow rotor 24 and is fixed to the output element 23. Thus, the hollow rotor 24, the commutator 22, and the output element 23 are connected as a single unit for simultaneous rotation.

Referring again to FIG. 2 and FIG. 4, in order to prevent the commutator 22 and the output element 23 from contact with the windings 27 on the hollow rotor 24, the front and rear ends of each fixing rod 246 are each mounted with a position-limiting tube 247 whose outer diameter is greater than the diameter of the fixing holes 244 and which therefore cannot extend into any fixing hole 244 and is located either between the commutator 22 and the hollow rotor 24 or between the output element 23 and the hollow rotor 24 to keep the commutator 22 or the output element 23 from contact with the windings 27 on the hollow rotor 24. It should be pointed out that, in other embodiments of the present invention, the hollow rotor 24, the commutator 22, and the output element 23 may be connected in other ways, provided that the hollow rotor 24 is able to drive the commutator 22 and the output element 23 simultaneously and is spaced from each of the commutator 22 and the output element 23 by a predetermined spacing.

Figure 5:
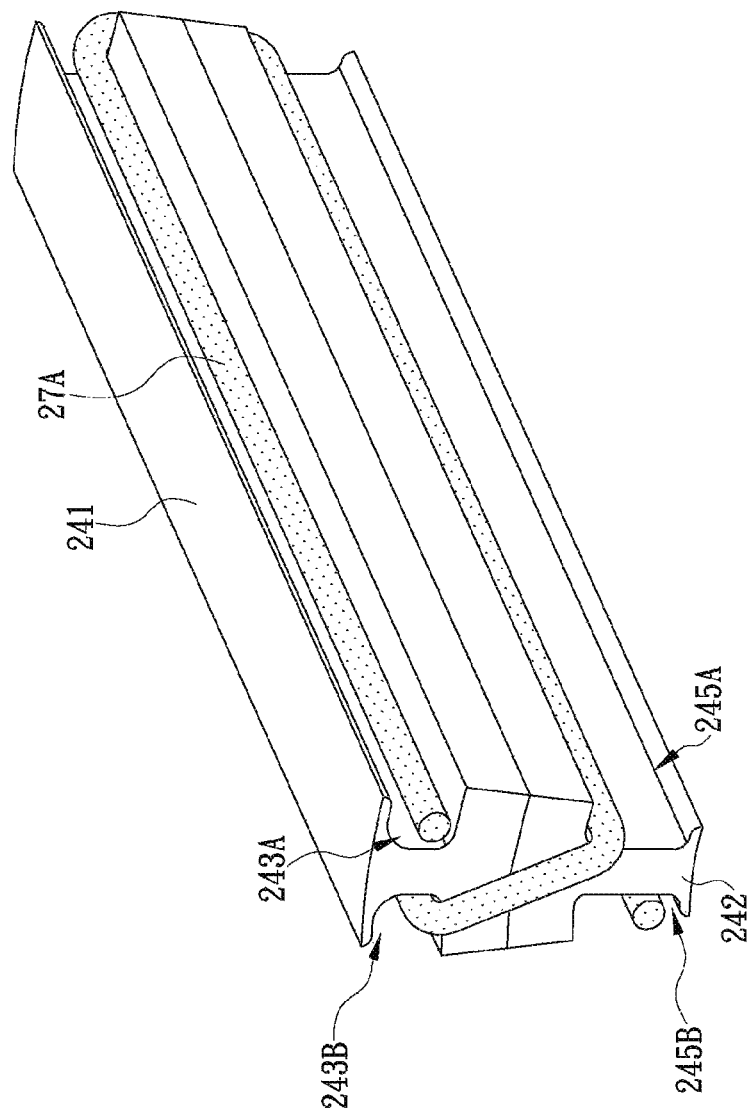
FIG. 5 schematically shows how a turn of winding is wound around the hollow rotor in the first embodiment of the present invention.

As shown in FIG. 2 and FIG. 4, the outer iron core 241 and the inner iron core 242 are fixedly connected together by the windings 27, which prevent the outer icon core 241 and the inner iron core 242 from separation from each other and thereby fix the fixing rods 246 in the fixing holes 244 respectively. The windings 27 of the present invention are wound in the following manner, although in other embodiments of the invention the windings 27 may be wound onto the hollow rotor 24 by different methods. Referring to FIG. 5, which shows only a portion of the hollow rotor 24 and one turn of winding 27 for the sake of simplicity, the outer surface of the outer iron core 241 is formed with two adjacent outer winding grooves 243A and 243B, and the inner surface of the inner iron core 242 is formed with two adjacent inner winding grooves 245A and 245B. The outer winding groove 243A corresponds to the inner winding groove 245A while the outer winding groove 243B corresponds to the inner winding groove 245B. One end (hereinafter the first end) of the winding 27A is electrically connected to a commutator plate 221. The other end (hereinafter the second end) of the winding 27A is inserted into the front end of the outer winding groove 243A; passes through the outer winding groove 243A; extends out of the rear end of the outer winding groove 243A; is then inserted into the rear end of the inner winding groove 245A; passes through the inner winding groove 245A; extends out of the front end of the inner winding groove 245A; runs diagonally to and is inserted into the outer winding groove 243B; then runs sequentially through the outer winding groove 243B, the rear end of the outer winding groove 243B, the rear end of the inner winding groove 245B, and the inner winding groove 245B; extends out of the front end of the inner winding groove 245B; and is electrically connected to another commutator plate (hereinafter the second commutator plate) 221. The winding 27A wound in the foregoing manner is referred to as one turn of winding 27A.

Figure 6:
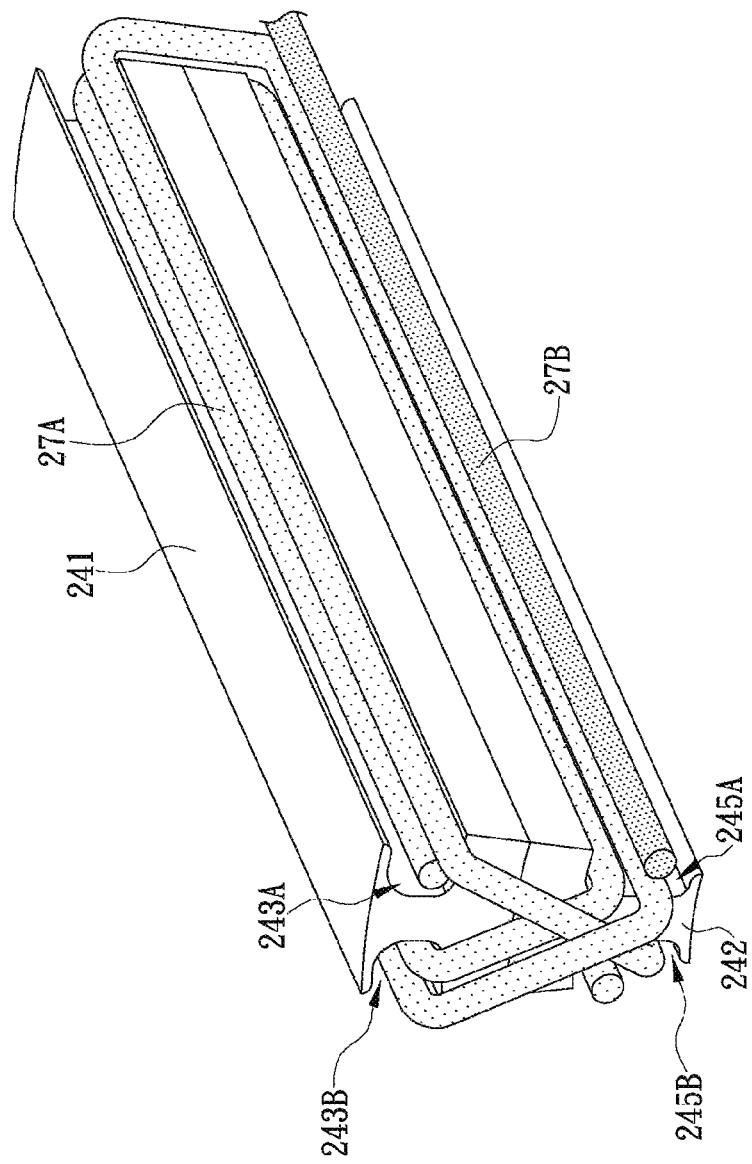
FIG. 6 schematically shows how plural turns of windings are wound around the hollow rotor in the first embodiment of the present invention.

Referring to FIG. 6 in conjunction with FIG. 2, when it is desired to wind another turn or more turns of winding 27 onto the hollow rotor 24, all that needs to be done is to pass diagonally the winding 27A jutting out of the front end of the inner winding groove 245B into the front end of the outer winding groove 243A and then repeat the winding steps described above. The winding 27B is adjacent to the winding 27A and has its second end (equivalent to the second end of the winding 27A) jutting out of the front end of the inner winding groove 245A. Thus, both the first end of the winding 27A and the second end of the winding 27B are electrically connected to the same commutator plate 221. While supplying a current to the first end of the winding 27A, this commutator plate 221 receives the current delivered through the second end of the winding 27B. When the commutator plate 221 subsequently performs reversal of current direction, the aforesaid current directions are reversed, in order for each of the windings 27A and 27B to generate an electromagnetic field corresponding to the existing current direction.

In the first embodiment, referring to FIG. 2 and FIG. 3, the DC motor 2 is provided with two stators, namely an outer stator 21 and an inner stator 25, both fixed in the housing 20. The outer stator 21 includes a plurality of outer magnets 211. The outer magnets 211 are located in the housing body 20C and are fixed to the inner wall of the housing body 20C along the circumferential direction of the housing body 20C (i.e., of the housing 20). Each two adjacent outer magnets 211 are spaced apart and are opposite in polarity. Each outer magnet 211 can be a single magnetic component or composed of a plurality of magnetic components of the same polar direction; the present invention has no limitations in this regard. Once mounted in the outer stator 21 along the axial direction of the housing 20 and spaced from the outer stator 21 by a first spacing 24A, the hollow rotor 24 can rotate freely in the outer stator 21. The inner stator 25, on the other hand, includes a plurality of inner magnets 251, is fixed in the axial hole 240 of the hollow rotor 24 along the circumferential direction of the housing 20 via bearings 26A and 26B, and is spaced from the hollow rotor 24 by a second spacing 24B in order for the hollow rotor 24 to rotate freely around the inner stator 24. Each two adjacent inner magnets 251 are spaced apart and are opposite in polarity. Each inner magnet 251 can be a single magnetic component or composed of a plurality of magnetic components of the same polar direction; the present invention has no limitations in this regard. In other embodiments of the present invention, there may be only one stator (e.g., the outer stator 21 or the inner stator 25) so as to reduce the volume or production cost of the DC motor 2. Referring to FIG. 2, when the windings 27 on the hollow rotor 24 receive the currents supplied by the commutator 22 and generate the corresponding electromagnetic fields, the electromagnetic fields repel the magnets (e.g., the outer magnets 211 or the inner magnets 251) on the stators (e.g., the outer stator 21 or the inner stator 25) respectively such that the hollow rotor 24 is rotated and drives the output element 23 simultaneously. Thus, the rotating force generated by the hollow rotor 24 is output to the load, wherein the rotating force features a low rotation speed and a large torque.

Figure 7:
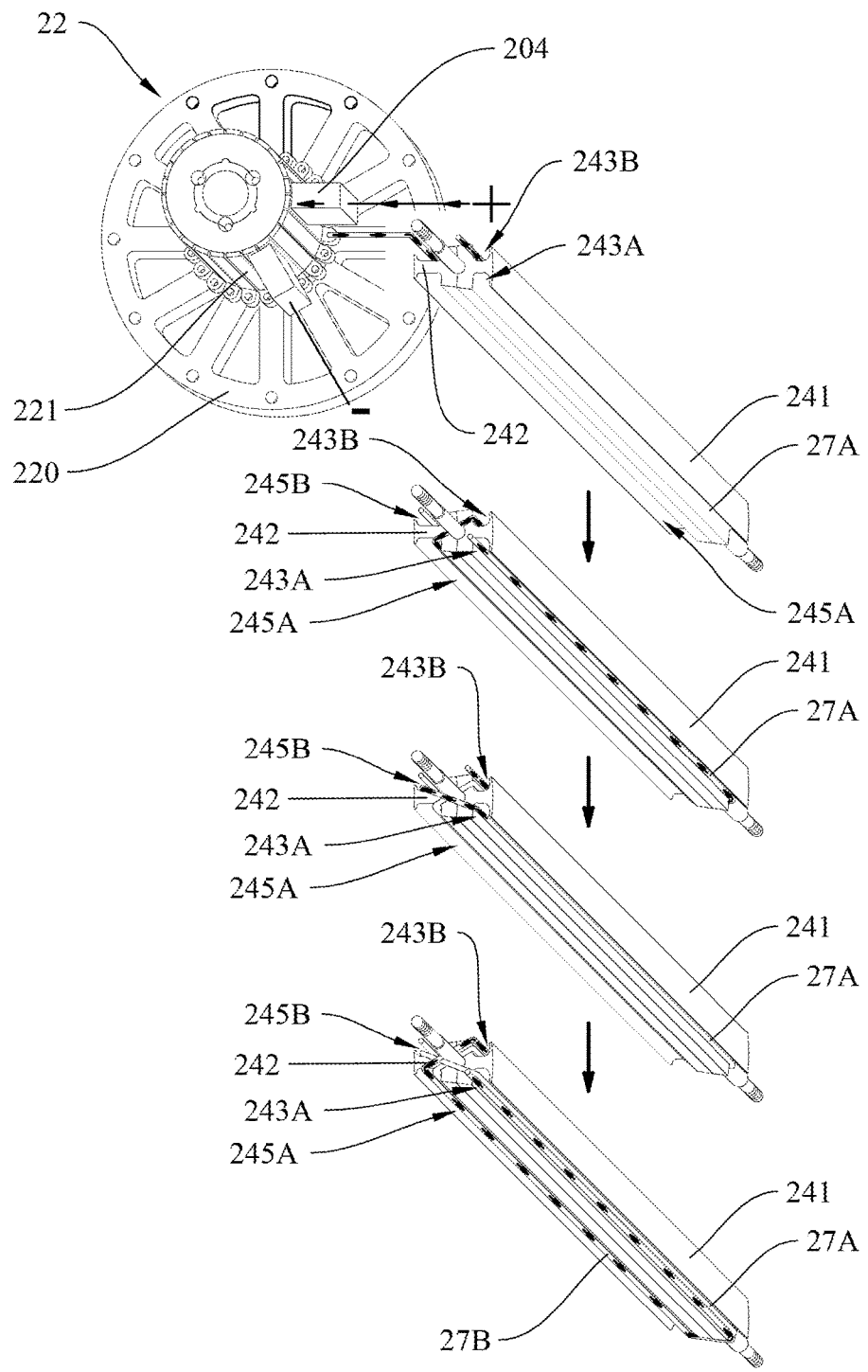
FIG. 7 is an exploded perspective view of the hollow rotor in second embodiment of the present invention.

While the hollow rotor 24 described with reference to FIG. 4 is assembled from the outer iron core 241 and the inner iron core 242, which are respectively and axially formed with the outer winding grooves 243 and the inner winding grooves 245, it is feasible to adjust the structure of the hollow rotor as needed. For example, in the second embodiment as shown in FIG. 7, the hollow rotor 34 includes an iron core which is assembled from a front iron core 341 and a rear iron core 342. The front surface of the front iron core 341 is provided with a plurality of radially extending front winding grooves 343, and the rear surface of the front iron core 341 is provided with a plurality of radially extending first recesses 344A. Similarly, the rear surface of the rear iron core 342 is provided with a plurality of radially extending rear winding grooves 345, and the front surface of the rear iron core 342 is provided with a plurality of radially extending second recesses 344B. The front winding grooves 343 and the rear winding grooves 345 are configured to be wound with windings in a way similar to that shown in FIG. 5 with the front winding grooves 343 corresponding to the outer winding grooves 243A and 243B, and the rear winding grooves 345 corresponding to the inner winding grooves 245A and 245B). When the front iron core 341 and the rear iron core 342 are assembled together, the rear surface of the front iron core 341 lies against the front surface of the rear iron core 342, and each first recess 344A corresponds to one second recess 344B to form a fixing hole. A plurality of fixing rods 346 are passed through the fixing holes respectively to connect with the hollow rotor 34.

Figure 8:
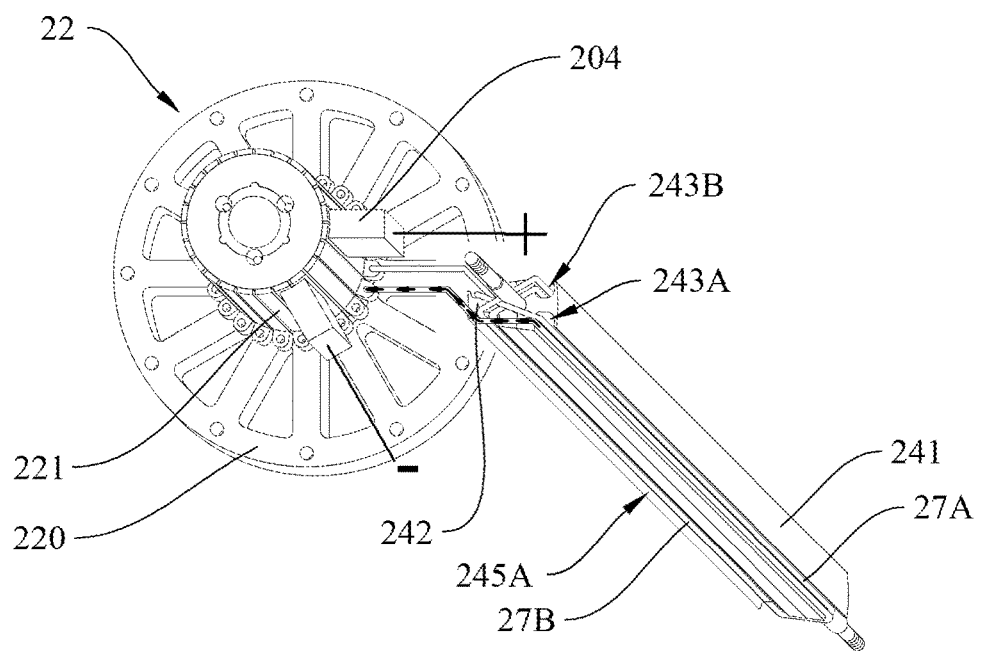
FIG. 8 is an exploded perspective view of the DC motor in the second embodiment of the present invention.
Figure 9:
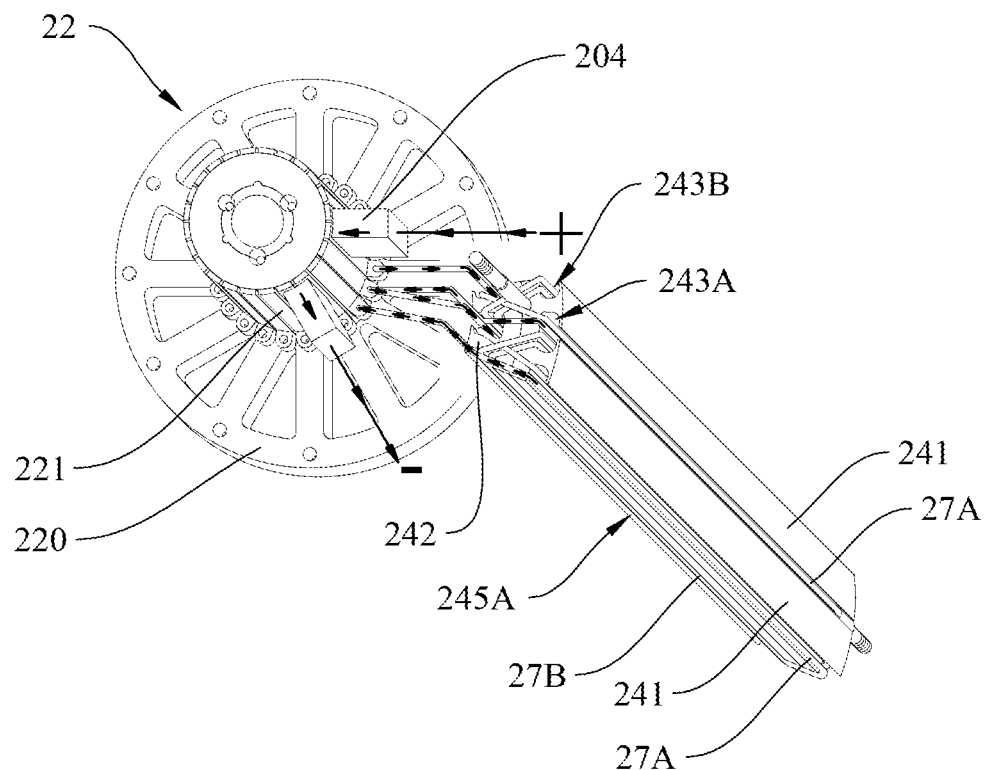
FIG. 9 is a sectional view of the DC motor in the second embodiment of the present invention.

Referring to FIG. 7 to FIG. 9, the hollow rotor 34 is formed therein with an axial hole 340 which extends along the axial direction of the hollow rotor 34 and in which a commutator 32 is mounted. In the second embodiment, the commutator 32 includes a disk 320 and a plurality of commutator plates 321. The commutator plates 321, each two adjacent ones of which are spaced apart, are mounted on the front side of the disk 320 and are electrically connectable to the carbon brushes 304 in the front cover 30A to receive the external currents supplied by the carbon brushes 304. The periphery of the disk 320 is connected to one end of each fixing rod 346 while the other end thereinafter the second end) of each fixing rod 346 juts out of and is therefore exposed from the hollow rotor 34. An output element 33 is fixed to the rear side of the disk 320 and is peripherally connected with the second ends of the fixing rods 346. The arrangement described above allows the hollow rotor 34 to drive the commutator 32 and the output element 33 simultaneously when rotated.

The hollow rotor 34 in the second embodiment is equally applicable to a DC motor. With continued reference to FIG. 7 to FIG. 9, the hollow rotor 34 is provided in a housing 30 which includes a front cover 30A and a rear cover 30B. More specifically, the hollow rotor 34 is located in a receiving space defined between the front cover 30A and the rear cover 30B. The gaps between the front cover 30A and the rear cover 30B form output holes (equivalent to the output holes 201 in FIG. 2) through which a transmission element can extend in order to connect with the output element 33. A front stator is mounted on the front side of the hollow rotor 34 and is spaced from the hollow rotor 34 by a first spacing. A rear stator is mounted on the rear side of the hollow rotor 34 and is spaced from the hollow rotor 34 by a second spacing. The front stator includes a plurality of front magnets 311. Each two adjacent front magnets 311 are spaced apart and are opposite in polarity. Each front magnet 311 can be a single magnetic component or composed of a plurality of magnetic components of the same polar direction; the present invention has no limitations in this regard. The rear stator includes a plurality of rear magnets 351. Each two adjacent rear magnets 351 are spaced apart and are opposite in polarity. Each rear magnet 351 can be a single magnetic component or composed of a plurality of magnetic components of the same polar direction; the present invention has no limitations in this regard, either. In the second embodiment, the front magnets 311 are fixed to the front cover 30A, and the rear magnets 351 are fixed to the rear cover 30B. The center of the front cover 30A and the center of the rear cover 30B are connected to the two ends of a shaft 39 respectively, with bearings 36A and 36B provided adjacent to the two ends of the shaft 39 respectively so that the hollow rotor 34 can rotate due to repulsion between the magnetic fields of the hollow rotor 34, the front stator, and the rear stator and hence drive the commutator 32 and the output element 33.

According to the above, the hollow rotor structure of the present invention is so designed that a manufacturer can adapt the number and position(s) of stator(s) (e.g., the aforesaid inner stator, outer stator, front stator, or rear stator) or other components to practical needs, thereby effectively controlling the performance and production cost of a DC motor. While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A hollow rotor structure with a winding structure for a direct-current (DC) motor, applicable to a DC motor, wherein the DC motor comprises a housing, and the housing is provided therein with a receiving space, the hollow rotor structure comprising:

a commutator mounted in the receiving space and pivotally connected to an inner wall of a front end of the housing along an axial direction of the housing, the commutator comprising a plurality of commutator plates, each two adjacent said commutator plates being configured to supply a current to a winding and to reverse a direction of the current at a preset frequency so that an electromagnetic field generated by the winding is simultaneously reversed too, wherein the direction is repeatedly reversed at the preset frequency;

an output element mounted in the receiving space and pivotally connected to an inner wall of a rear end of the housing along the axial direction of the housing;

a hollow rotor comprising an iron core, the iron core being wound with a plurality of said windings, the hollow rotor being formed therein with an axial hole extending along an axial direction of the hollow rotor, the hollow rotor being mounted in the receiving space along the axial direction of the housing, the hollow rotor being spaced from a stator fixed in the housing, the hollow rotor having a front end connected to the commutator and a rear end connected to the output element such that the commutator and the output element are simultaneously rotatable with the hollow rotor, each said winding having two ends respectively and electrically connected to two adjacent said commutator plates of the commutator in order to receive the current supplied by the commutator and cause the hollow rotor to generate a corresponding electromagnetic field; and a plurality of fixing rods, the fixing rods being fixed to the hollow rotor along a circumferential direction of the hollow rotor, each said fixing rod having a front end connected to the commutator and a rear end connected to the output element.

2. The hollow rotor structure of claim 1, wherein the iron core is assembled from a plurality of silicon steel plates.

3. The hollow rotor structure of claim 2, wherein the commutator comprises a disk in addition to the commutator plates, the disk has a front side provided with the commutator plates, each two adjacent said commutator plates are spaced apart, and the front end of the hollow rotor is fixed to a rear side of the disk.

4. The hollow rotor structure of claim 1, wherein the iron core comprises:

an outer iron core assembled from a plurality of silicon steel plates, the outer iron core having an inner surface and an outer surface, wherein the outer surface of the outer iron core is provided with a plurality of outer winding grooves extending along an axial direction of the outer iron core so as to receive the windings, and the inner surface of the outer iron core is provided with a plurality of first recesses extending along the axial direction of the outer iron core; and an inner iron core assembled from a plurality of silicon steel plates, the inner iron core having an inner surface and an outer surface, wherein the inner surface of the inner iron core is provided with a plurality of inner winding grooves extending along an axial direction of the inner iron core so as to receive the windings, the outer surface of the inner iron core is provided with a plurality of second recesses extending along the axial direction of the inner iron core and lies against the inner surface of the outer iron core, each of the first recesses and a corresponding one of the second recesses jointly form a fixing hole, and each said fixing hole is configured to fix one of the fixing rods so that the fixing rods and the hollow rotor are connected together.

5. The hollow rotor structure of claim 4, wherein the front end and the rear end of each said fixing rod are each mounted with a position-limiting tube, each said position-limiting tube has an outer diameter greater than a diameter of a corresponding one of the fixing holes, the position-limiting tube at the front end of each said fixing rod is located between the commutator and the hollow rotor, and the position-limiting tube at the rear end of each said fixing rod is located between the output element and the hollow rotor.

6. The hollow rotor structure of claim 4, wherein one of the two ends of each said winding is electrically connected to a said commutator plate, and the other end of each said winding is inserted into a front end of a said outer winding groove, passes through the outer winding groove, extends out of a rear end of the outer winding groove, is inserted into a rear end of a said inner winding groove corresponding to the outer winding groove, passes through the inner winding groove, extends out of a front end of the inner winding groove, runs diagonally to and is inserted into a front section of an adjacent said outer winding groove, passes through the adjacent outer winding groove, extends out of a rear end of the adjacent outer winding groove, is inserted into a rear end of a said inner winding groove corresponding to the adjacent outer winding groove, passes through the inner winding groove corresponding to the adjacent outer winding groove, extends out of a front end of the inner winding groove corresponding to the adjacent outer winding groove, and is electrically connected to another said commutator plate.

7. The hollow rotor structure of claim 6, wherein the front end and the rear end of each said fixing rod are each mounted with a position-limiting tube, each said position-limiting tube has an outer diameter greater than a diameter of a corresponding one of the fixing holes, the position-limiting tube at the front end of each said fixing rod is located between the commutator and the hollow rotor, and the position-limiting tube at the rear end of each said fixing rod is located between the output element and the hollow rotor.

* * * * *